No. 852,619. PATENTED MAY 7, 1907.
F. RICH.
DETACHABLE INNER TUBE FOR PNEUMATIC TIRES.
APPLICATION FILED JUNE 30, 1906.
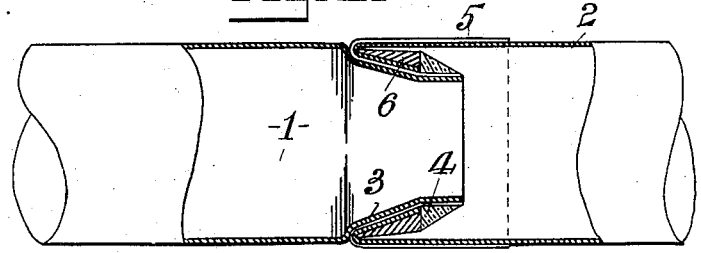
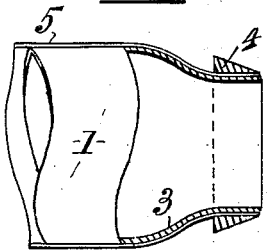 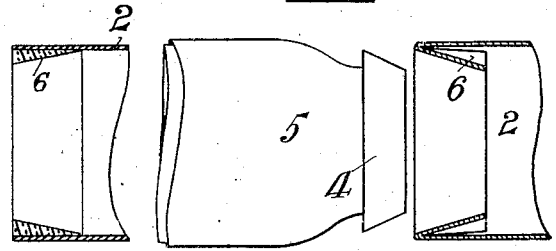
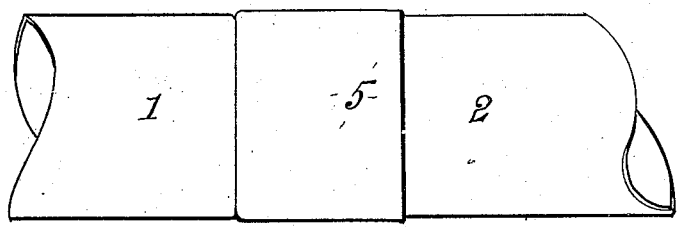

UNITED STATES PATENT OFFICE.

FRANK RICH, OF CRAWLEY, ENGLAND.

DETACHABLE INNER TUBE FOR PNEUMATIC TIRES.

No. 852,619.　　　Specification of Letters Patent.　　　Patented May 7, 1907.

Application filed June 30, 1906. Serial No. 324,194.

*To all whom it may concern:*

Be it known that I, FRANK RICH, tobacconist, residing at High street, Crawley, in the county of Sussex, England, have invented certain new and useful Improvements in Detachable Inner Tubes for Pneumatic Tires; and I do hereby declare the following to be a full, clear, and exact description of the invention, such as will enable others skilled in the art to which it appertains to make and use the same.

My invention relates to improvements in detachable inner tubes for pneumatic tires and consists in the special construction and formation of a joint between the two separate ends of a divided tube that is air tight under pressure and capable of disjunction when deflated, enabling the tubes to be detached from the wheel without disturbing the fork or unshipping the wheel.

It is carried out as follows reference being made to the accompanying drawings in which:—

Figure 1, shows my improvement in section. Fig. 2. shows the prepared ends of the inner tube previous to insertion and formation of a joint. Fig. 3. shows tube ends ready for jointing. Fig. 4. shows the exterior of the tube when jointed and inflated.

In the drawings 1, and 2, are the ends of a divided inner tube which for purpose of discrimination I will term male and female respectively.

The male end of the tube 1, is slightly contracted as at 3, and round the exterior I secure, attach, vulcanize, or mold on, a rubber ring 4 preferably taper shaped as shown. Secured under or attached to this ring 4 is a short section of flexible rubber tube 5, which is capable of being repeatedly turned back upon itself without destroying the substance where bent, forming a joint cover when in place.

The female end 2, is fitted in a similar manner with a rubber ring 6, as shown, the larger end being on the outer extremity see Fig. 2.

Both rings 4 and 6, are formed of rubber but vulcanized to a rather stiffer degree than that of the tube rubber.

The operation of my invention is as follows:—To form a joint the female ring 6 is turned in upon itself as shown in Fig. 3. The male tube end with ring is then inserted so that the larger ends of each ring buttress against each other, and the rubber joint cover 5 drawn back over the female end. The tube is then jointed, and when inflated in the usual manner under the outer cover forms a perfectly air tight joint.

The advantages of this construction are evident since in the case of heavy motor cycle tubes and the like, the tire when deflated can have the tube disjointed and the same withdrawn for repair without disturbing the wheel, forks or other fixed parts. Further when inflated the internal pressure only serves to make the joint more perfect and air tight, the position of the tapered rings allowing this when the tube is inflated.

What I claim and desire to be secured by Letters Patent is:—

1. In a pneumatic tire, the combination, with a tube-section provided with a tapering end portion having an externally projecting ring, of a second tube-section having an end portion provided with a ring which projects internally when the said end portion is in its normal position, said end portion being foldable back and forth inside the main portion of its tube-section, and a tubular shield secured to the tapering end portion of the first said tube-section and being foldable back and forth over the main portions of both of the said tube-sections.

2. In a pneumatic tire, the combination, with a tube-section provided with a tapering end portion, of a ring secured outside the said tapering end portion, a second tube-section having an end portion provided with a ring which projects internally when the said end portion is in its normal position, said end portion being foldable back and forth inside the main portion of its tube-section, and a tubular shield having a tapering end portion which is secured between the tapering end portion of the first said tube-section and its said ring, the main portion of the said shield being foldable back and forth over the main portions of both of the said tube-sections.

In testimony whereof I affix my signature, in presence of two witnesses.

FRANK RICH.

Witnesses:
　H. D. JAMESON,
　F. L. RAND.